(No Model.) 2 Sheets—Sheet 1.
A. C. BRANTINGHAM.
PROPORTIONAL INDICATOR FOR MILL PRODUCTS.
No. 546,413. Patented Sept. 17, 1895.
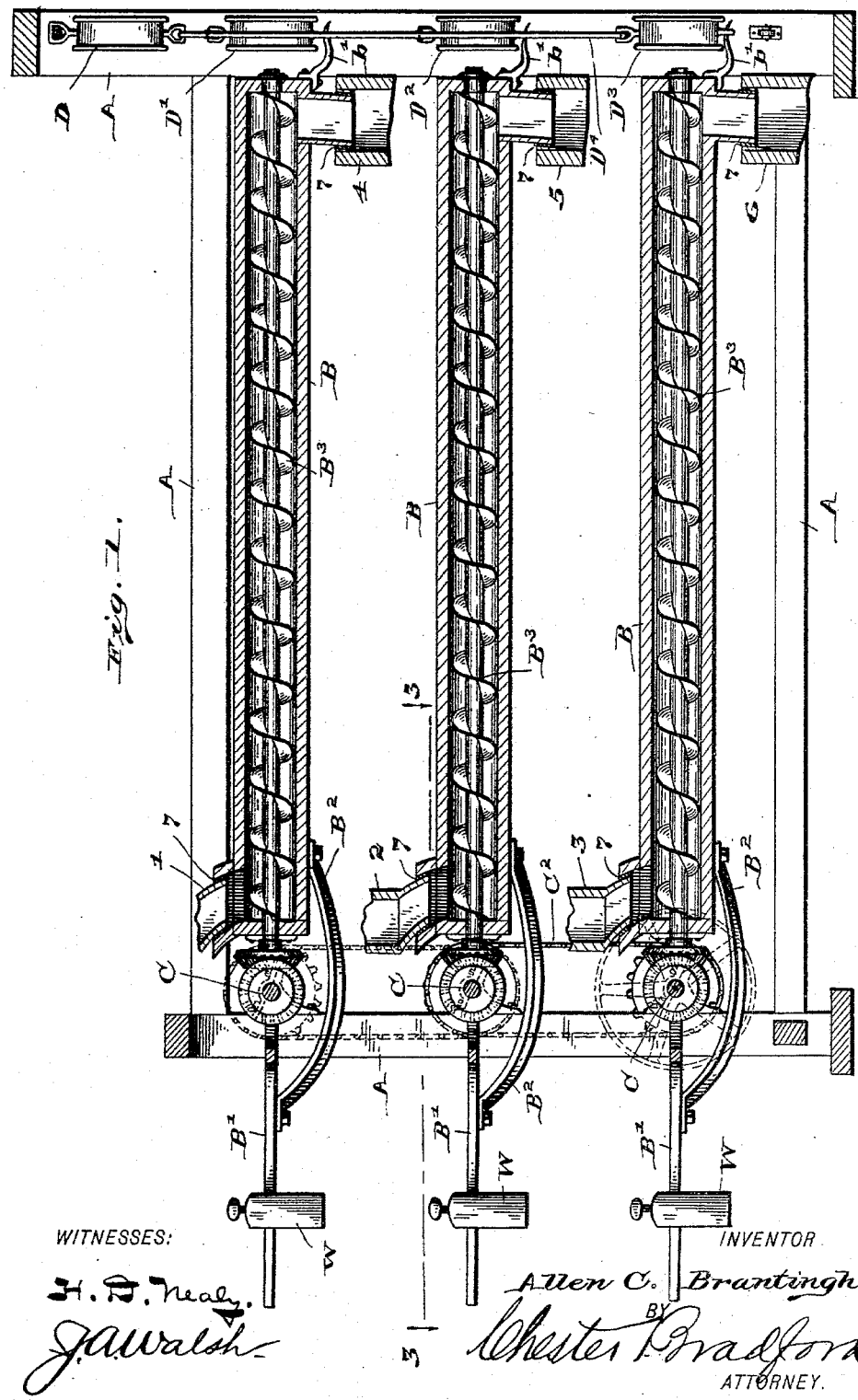

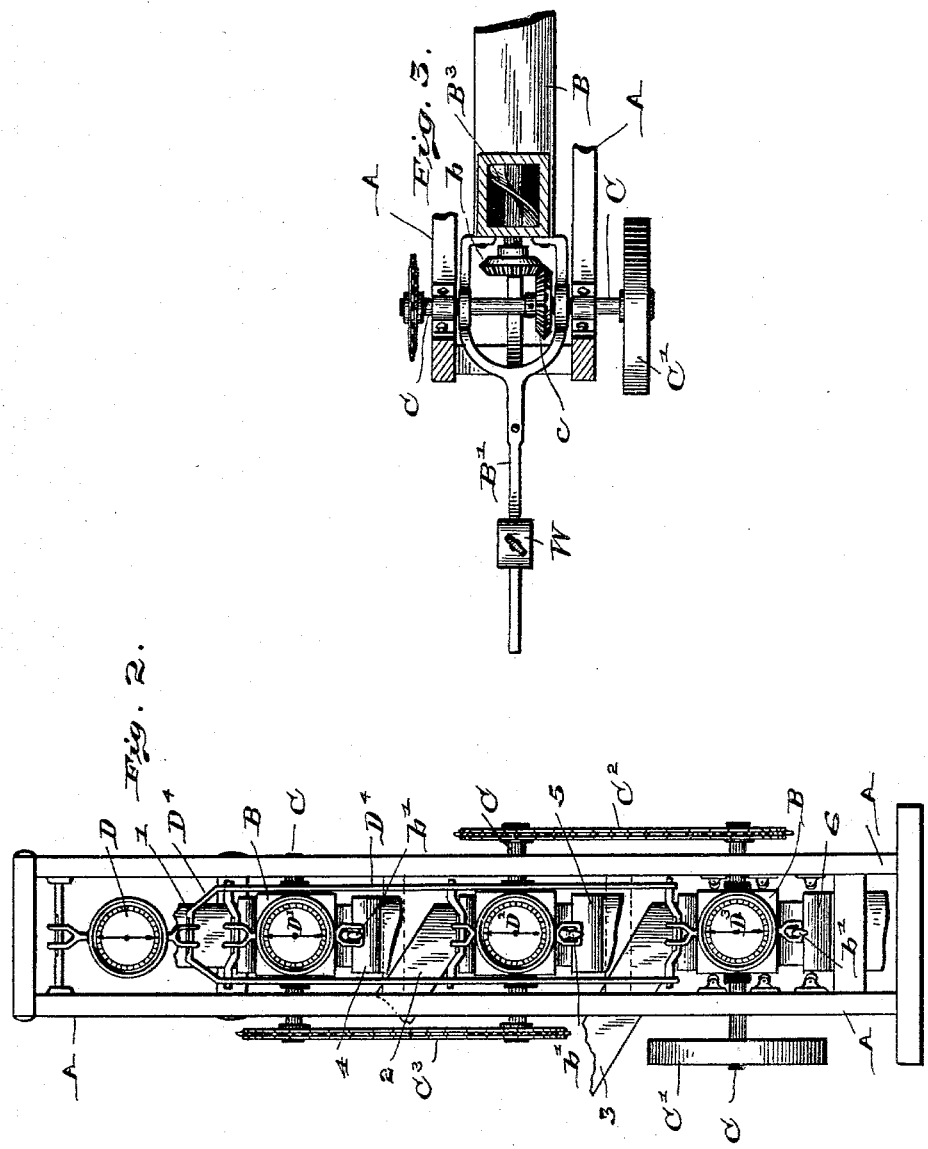

United States Patent Office.

ALLEN C. BRANTINGHAM, OF TOLEDO, OHIO, ASSIGNOR TO THE NORDYKE & MARMON COMPANY, OF INDIANAPOLIS, INDIANA.

PROPORTIONAL INDICATOR FOR MILL PRODUCTS.

SPECIFICATION forming part of Letters Patent No. 546,413, dated September 17, 1895.

Application filed November 2, 1894. Serial No. 527,758. (No model.)

*To all whom it may concern:*

Be it known that I, ALLEN C. BRANTINGHAM, a citizen of the United States, residing at Toledo, in the county of Lucas and State of Ohio, have invented certain new and useful Improvements in Proportional Indicators for Mill Products, of which the following is a specification.

The principal object of my said invention is to produce an apparatus through which the total quantity of the products of a mill will be discharged in the usual separate grades and by which the proportion each grade bears to the whole can be constantly observed. I have illustrated an apparatus arranged for three grades of product only, but manifestly it is applicable, by simply providing additional corresponding parts, to be used with any greater number of grades, and by dispensing with and detaching one or more of those shown to a fewer number, and a single apparatus of this character may be used to indicate the quantity passing in a single stream.

Referring to the accompanying drawings, which are made a part hereof, and on which similar letters and numerals of reference indicate similar parts, Figure 1 is a vertical longitudinal sectional view of an apparatus embodying my said invention; Fig. 2, an end elevation of the same, and Fig. 3 a detail horizontal sectional view as seen when looking downwardly from the dotted line 3 3 in Fig. 1.

In said drawings the portions marked A represent the framework of the apparatus; B, conveyer-trunks; C, shafts supporting said conveyer-trunks; D, a weight-indicating device arranged to indicate the entire weight of the mill product passing through the several conveyers; $D'$ $D^2$ $D^3$, similar weight-indicating devices arranged to operate with the separate conveyers, and 1 2 3 4 5 6 fragments of the spouts or tubes leading to and from the various conveyers.

The framework is of a suitable size and character for the work to be performed and supports the mechanism of the device, being provided with suitable bearings therefor.

The conveyer-tubes B are carried upon the shafts C by means of forked arms $B'$, which are rigidly attached to said tubes and extend back over said shafts a suitable distance, where counterbalancing-weights W are provided. These weights are shown as adjustable for facility in setting up the machine, but ordinarily after the first adjustment is effected they will not need to be disturbed. Curved brace-bars $B^2$ are shown as extending from the arms $B'$ to the under side of the conveyer-tubes B for the purpose of providing additional strength and rigidity to the structure; but manifestly these have no other function, nor do they in any way modify the operation of the apparatus. When the conveyer structures are in place and adjusted, they are intended to balance perfectly on the shafts C, which also act as pivots for these structures. Within the conveyer-tubes are the usual conveyers $B^3$, and upon the shafts of these, as most plainly shown in Fig. 3, are bevel gear-wheels $b$, with which corresponding bevel gear-wheels $c$ on the shafts C will engage, and whereby the conveyers may be driven. As the friction of the running parts may have some effect upon the operation of the apparatus, the conveyer structures should be adjusted to a "running balance," rather than a "stationary balance."

The shafts C, as above indicated, serve both as pivots for the conveyer structures and as driving-shafts, from which the conveyers are driven. One of these shafts, preferably the lower one, is also preferably provided with a pulley $C'$, which may be driven from any suitable source of power, and the other shafts (when two or more devices are used) are connected thereto by suitable chain-belts $C^2$ $C^3$, running on suitable sprocket-wheels on said shafts.

The arrangement of the weighing or balancing devices (in the triplicate apparatus shown) is best illustrated in Fig. 2. The upper one D carries a frame $D^4$, to which each of the other ones are separately suspended, and thus said upper one will indicate on its dial the aggregate of material passing through at any one time. The others $D'$, $D^2$, and $D^3$, as above stated, are independently suspended to the frame $D^4$, and points $b'$, extending out from the conveyer-tubes B, engage with eyes on the lower sides of said balances, so that the dials thereof will indicate the weight of material passing through each of said conveyers separately. The operator may thus at any time observe both the aggregate weight passing through per given time and the proportion which is passing through each conveyer. To illustrate: Suppose that the aggregate weight of the material in all three of the conveyers at any one time is one hundred and twenty pounds. That quantity will be indicated on the upper device D. And suppose that the amount passing through the upper conveyer is seventy pounds. That would be indicated upon the device D', and if thirty-three pounds are passing through the middle conveyer that would be indicated upon the device $D^2$, while the remainder, seventeen pounds, passing through the lower conveyer, would be indicated upon the device $D^3$, and it is a matter of simple calculation then what proportion of the whole is passing through each conveyer, which is a matter of some importance in accurate milling, where the product of the mill is divided into several grades, each of which is discharged separately, as the operator must be able to know in some way whether the proper proportions of the total product are being produced—as high, medium, and low grades, respectively, or such grades as the mill is at the time producing; and if the apparatus shows that more than the proper proportion of one grade is being produced and less of another this indicates that there should be some adjustment of the machinery. The use of my apparatus in scientific milling is therefore of great advantage, and substitutes an accurate, sensitive, and easily observed means of ascertaining the result for the uncertain and unavoidably somewhat inaccurate means heretofore employed. The spouts 1, 2, and 3 are the spouts leading from the mill to this apparatus and are of a usual form and construction, except that at the point where they connect with the conveyer-tubes their surfaces are struck on curved lines from the axes on which the conveyer structures swing. The tubes or spouts 4, 5, and 6 are also similar to any ordinary conveying-spouts, except that their mouthpieces also are fitted to receive discharging-mouths on the conveyer-tubes the surfaces of which are also struck from the axes on which the conveyer structures tilt. In order that there shall be no appreciable friction at these points of union, and still no openings through which any of the fine products might escape, there are placed in the joints pieces 7, of felt, chamois-skin, or other suitable soft, pliable material.

As hereinbefore indicated, this apparatus is capable of use as a single device for the purpose of indicating the weight passing through per given time, where the entire product of a mill is discharged in a single stream and without grading, and in such a case of course there would be but one of the conveyers and connected parts and only one weight-indicating device, which in such a case would be arranged similar to the weighing device D, and all the remainder of the apparatus will be disconnected or dispensed with.

Having thus fully described my said invention, what I claim as new, and desire to secure by Letters Patent, is—

1. The combination, in an indicator for mill products, of a balanced conveyer structure, an ingress spout leading thereto, an egress pipe leading therefrom, and a weight-indicating device connected thereto and arranged as described whereby the weight of the material passing through the conveyer at any given time will be indicated by said weight-indicating device.

2. The combination, in an indicator for mill products, of several balanced conveyer structures, each adapted to receive one grade of said products, a single balancing or weighing device carrying a frame-work suspended thereto, an independent balancing or weighing device for each conveyer structure carried by said frame-work, and a point of engagement between such conveyer sections and the corresponding balancing or weighing devices, whereby the total mill product passing may be indicated, and also the proportion thereof passing through each conveyer structure.

3. The combination, in a weighing or indicating device for mill products, of several conveyer structures each connected with a spout leading from one division of the grading or separating apparatus and receiving the discharge therefrom, and an independent weighing or balancing device connected with each of said conveyer structures, whereby the amount or proportion passing through each conveyer structure may be independently observed at all times, substantially as set forth.

In witness whereof I have hereunto set my hand and seal, at Toledo, Ohio, this 30th day of October, A. D. 1894.

ALLEN C. BRANTINGHAM. [L. S.]

Witnesses:
M. W. PLATT,
GEO. J. RUDD.